(12) United States Patent

Ni et al.

(10) Patent No.: US 12,568,278 B2

(45) Date of Patent: Mar. 3, 2026

(54) RECOMMENDATION METHOD, DEVICE, AND STORAGE MEDIUM

(71) Applicant: Beijing Zitiao Network Technology Co., Ltd., Beijing (CN)

(72) Inventors: Jiabao Ni, Beijing (CN); Yijie Li, Beijing (CN); Huifa Chen, Beijing (CN); Can Yang, Beijing (CN); Mengying Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/737,765

(22) Filed: Jun. 7, 2024

(65) Prior Publication Data

US 2024/0323490 A1 Sep. 26, 2024

Related U.S. Application Data

(63) Continuation of application No. PCT/CN2022/134152, filed on Nov. 24, 2022.

(30) Foreign Application Priority Data

Dec. 7, 2021 (CN) .......................... 202111484967.8

(51) Int. Cl.
H04N 21/466 (2011.01)
G06F 16/735 (2019.01)
(Continued)

(52) U.S. Cl.
CPC ....... H04N 21/4668 (2013.01); G06F 16/735 (2019.01); G06F 16/739 (2019.01);
(Continued)

(58) Field of Classification Search
CPC ........... H04N 21/4668; H04N 21/2187; H04N 21/431; H04N 21/472; H04N 21/4758;
(Continued)

(56) References Cited

U.S. PATENT DOCUMENTS

2016/0071132 A1* 3/2016 Roozen .............. G06Q 30/0203
705/7.32
2017/0302979 A1 10/2017 Kaya et al.
(Continued)

FOREIGN PATENT DOCUMENTS

CN 102523511 A 6/2012
CN 106131601 A 11/2016
(Continued)

OTHER PUBLICATIONS

China National Intellectual Property Administration, Office Action and Search Report Issued in Application No. 202111484967.8, Mar. 25, 2023, 25 pages.
ISA China National Intellectual Property Administration, International Search Report and Written Opinion Issued in Application No. PCT/CN2022/134152, Feb. 9, 2023, WIPO, 15 pages.

*Primary Examiner* — Cynthia M Fogg

(74) *Attorney, Agent, or Firm* — Alleman Hall LLP

(57) ABSTRACT

The present invention provides a recommendation method and apparatus, a device, and a storage medium. The method comprises: if it is determined that an operation for a target media content meets a preset condition, displaying a target feedback interface; and then receiving an input acting on the target feedback interface; and sending the input to a server to determine a video to be recommended corresponding to the input.

19 Claims, 5 Drawing Sheets

(51) Int. Cl.

| | | |
|---|---|---|
| *G06F 16/738* | (2019.01) | |
| *H04N 21/2187* | (2011.01) | |
| *H04N 21/431* | (2011.01) | |
| *H04N 21/472* | (2011.01) | |
| *H04N 21/475* | (2011.01) | |

(52) U.S. Cl.
CPC ....... *H04N 21/2187* (2013.01); *H04N 21/431* (2013.01); *H04N 21/472* (2013.01); *H04N 21/4758* (2013.01)

(58) Field of Classification Search
CPC ............. H04N 21/475; H04N 21/4756; H04N 21/4826; H04N 21/251; H04N 21/44204; H04N 21/44222
USPC .......................................................... 725/46
See application file for complete search history.

(56) References Cited

U.S. PATENT DOCUMENTS

| | | | |
|---|---|---|---|
| 2020/0322647 A1* | 10/2020 | Zheng ................ | H04N 21/8549 |
| 2022/0385953 A1* | 12/2022 | Li ...................... | H04N 21/2668 |
| 2023/0009446 A1* | 1/2023 | Mun ...................... | H04L 65/65 |
| 2025/0126322 A1* | 4/2025 | Lidaka .................. | G06V 40/28 |

FOREIGN PATENT DOCUMENTS

| | | | | |
|---|---|---|---|---|
| CN | 108810580 A | 11/2018 | | |
| CN | 109168047 A | 1/2019 | | |
| CN | 111447239 A | 7/2020 | | |
| CN | 107846629 B | 1/2021 | | |
| CN | 113553507 A | 10/2021 | | |
| CN | 114071179 A * | 2/2022 | ......... | H04N 21/4788 |
| CN | 114157885 A | 3/2022 | | |
| WO | 2020000973 A1 | 1/2020 | | |

* cited by examiner

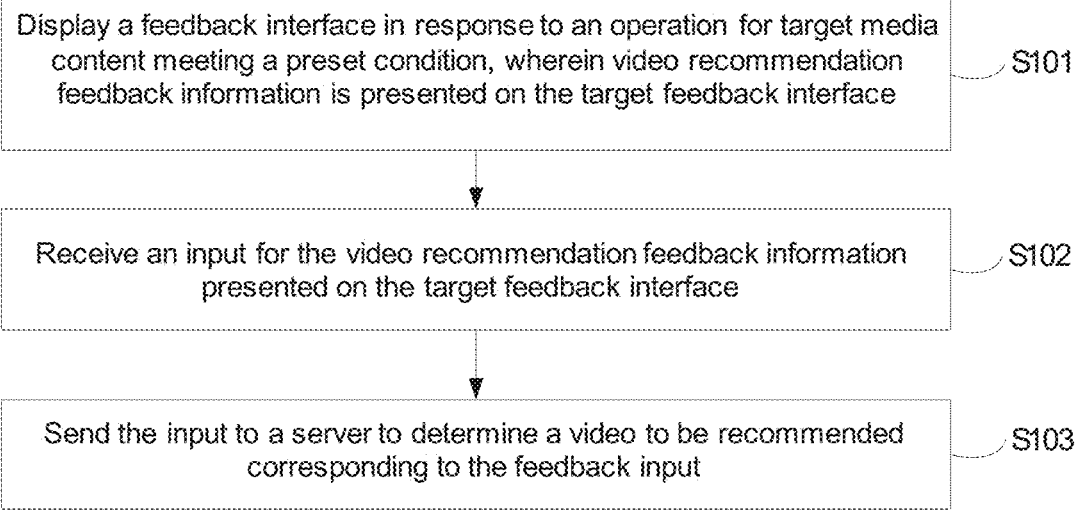

Display a feedback interface in response to an operation for target media content meeting a preset condition, wherein video recommendation feedback information is presented on the target feedback interface — S101

Receive an input for the video recommendation feedback information presented on the target feedback interface — S102

Send the input to a server to determine a video to be recommended corresponding to the feedback input — S103

FIG. 1

RECOMMENDATION METHOD, DEVICE, AND STORAGE MEDIUM

CROSS-REFERENCE TO RELATED APPLICATIONS

The present application claims priorities from PCT application No. PCT/CN2022/134152 filed on Nov. 24, 2022, and the Chinese patent application No. 202111484967.8, entitled "RECOMMENDATION METHOD AND APPARATUS, DEVICE, AND STORAGE MEDIUM", filed on Dec. 7, 2021, both of which are hereby incorporated by reference in their entirety.

TECHNICAL FIELD

The present disclosure relates to the field of data processing, and in particular, to a recommendation method and apparatus, device, and storage medium.

BACKGROUND ART

The existing video recommendation solutions mainly rely on recommendation systems to recommend videos based on likes, favorites, comments, etc. of target subjects for videos. The ways for feedback are rare and cannot meet the requirements.

CONTENTS OF THE INVENTION

According to an aspect, the present disclosure provides a recommendation method, the method comprising: displaying a target feedback interface in response to an operation for target media content meeting a preset condition, wherein video recommendation feedback information is presented on the target feedback interface; receiving an input for the video recommendation feedback information presented on the target feedback interface; and sending the input to a server to determine a video to be recommended corresponding to the input.

According to another aspect, the present disclosure provides a non-transitory computer readable storage medium having stored therein instructions that, when run on a terminal device, causes the terminal device to implement the method of the present disclosure.

According to another aspect, the present disclosure provides a device, comprising: a memory, a processor, and a computer program stored on the memory and executable on the processor that, when executed by the processor, implements the method of the present disclosure.

DESCRIPTION OF THE DRAWINGS

The drawings here are incorporated into the description and form part of the description, showing embodiments consistent with the present disclosure, and are used together with the description to explain the principles of the present disclosure.

In order to more clearly illustrate the embodiments of the present disclosure or technical solutions in the prior art, a brief introduction will be given below for the drawings to be used in the descriptions of the embodiments or the prior art. It is obvious for a person with ordinary skill in the art to acquire other drawings based on such drawings, without affording any inventive effort.

FIG. 1 is a flow chart of a recommendation method provided in embodiments of the present disclosure.

DETAILED DESCRIPTION OF THE EMBODIMENTS

Figure 2:
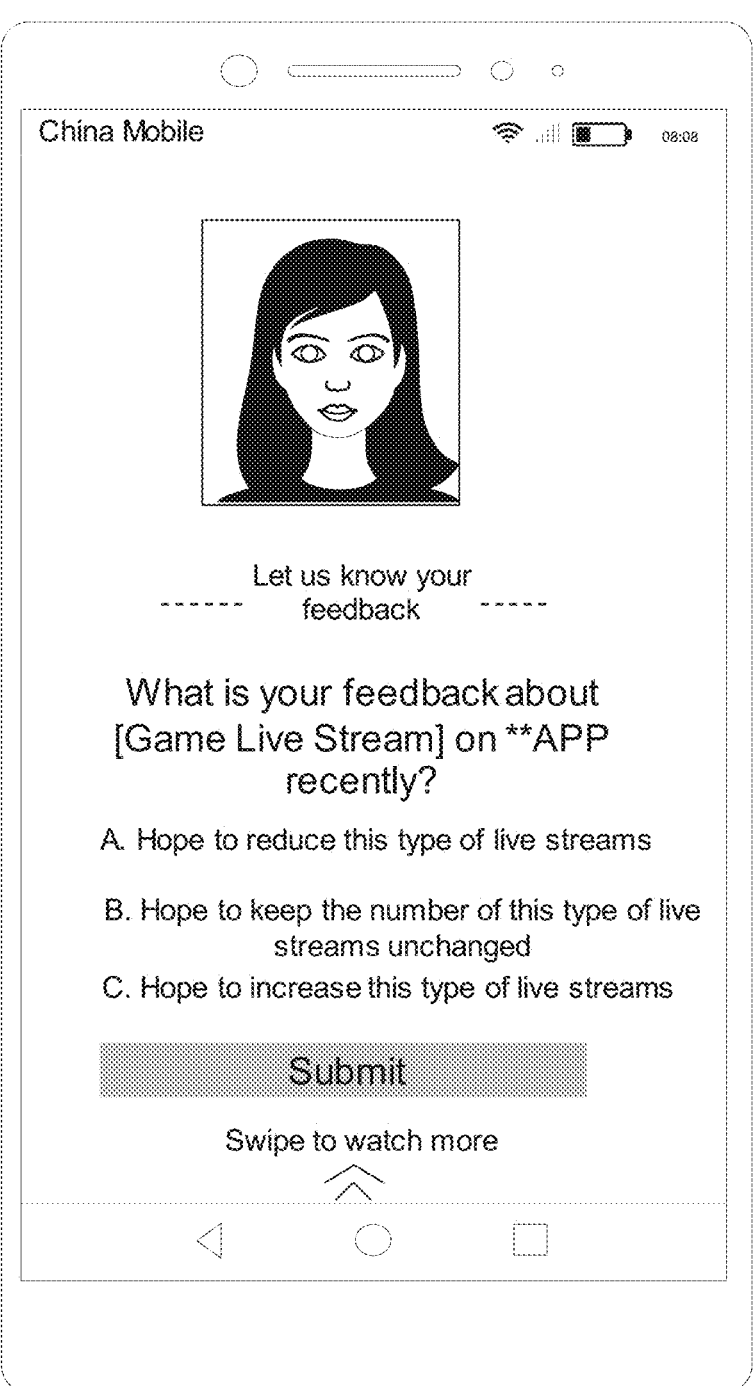
FIG. 2 is a schematic diagram of a target feedback interface provided in embodiments of the present disclosure.

In order that the above objectives, features and advantages of the present disclosure may be more clearly understood, the solutions of the present disclosure will be further described below. It is to be noted that, without conflictions, the embodiments and the features in the embodiments of the present disclosure can be combined with each other.

Many details are illustrated hereinbelow to facilitate sufficient understanding of the present disclosure, but the present disclosure may also be implemented by manners different than those as mentioned here. Obviously, the embodiments as described are just a part, instead of all, of the embodiments of the present disclosure.

The embodiments of the present disclosure provide a recommendation method. Referring to FIG. 1, a flow chart of a recommendation method in an embodiment of the present disclosure is illustrated, the method comprising the following steps:

S101: Displaying a target feedback interface in response to an operation for target media content meeting a preset condition, wherein video recommendation feedback information is presented on the target feedback interface.

In the embodiments of the present disclosure, displaying a target feedback interface in response to an operation for target media content meeting a preset condition may be displaying a target feedback interface in response to a target subject's operation for target media content meeting a preset condition. The target subject in the present disclosure may be a user. The video recommendation feedback information is used for determining a media content type that the target subject chooses.

In a possible embodiment, at least one media content type identifier and input controls corresponding to the at least one media content type identifier are presented on the target feedback interface. The input control indicates a feedback of the target subject for the at least one media content type, such as "chosen", or "unchosen", or "neutral", and correspondingly, the input control is for example an input control representing "chosen", an input control representing "unchosen", or a control representing "neutral". Thus, through the target feedback interface on which at least one media content type identifier and input controls corresponding to the at least one media content type identifier are displayed, based on a feedback input of the target subject, it is possible to directly determine a video type that the target subject chooses, such that the effectiveness of video recommendation is improved, and interactive experience is enhanced.

The recommendation method provided in the embodiments of the present disclosure is applied to a client, which may be client software deployed on a device terminal, and the device terminal may include a smartphone, a computer, a smartwatch, and the like.

In the embodiments of the present disclosure, the preset condition is used to define a timing for triggering the display of the target feedback interface.

When an operation for target media content is received, it is determined whether the operation for the target media content meets the preset condition, and if it is determined that it meets the preset condition, the target feedback interface is displayed.

In an optional embodiment, the operation for the target media content meeting the preset condition may include a switching operation for the target media content. Specifically, when the switching operation for the target media content is received, the target feedback interface is displayed.

The target media content may include a video preview stream or a live stream preview stream. In practical applications, when a switching operation for the video preview stream or the live stream preview stream is received, the target feedback interface is displayed.

In an optional embodiment, when a switching operation of swiping (e.g., swiping up or down) for the video preview stream or the live video stream is received, the target feedback interface is displayed. Specifically, when in the video preview stream, a switching operation of swiping for any preview video in the video preview stream triggers the display of the target feedback interface.

In another optional embodiment, when a switching operation of switching from the live video stream to the video preview stream is received, the target feedback interface is displayed. Specifically, when in the live video stream, if the switching operation of switching from the live video stream to the video preview stream is triggered by closing any live video in the live video stream, the target feedback interface is displayed on an interface of a target preview video corresponding to the switching operation.

In an optional embodiment, the operation for the target media content meeting the preset condition may include a playing operation for the target media content that is triggered in a case where a playing duration of the media content is not less than a first preset duration. Specifically, in a case where the playing operation for the target media content is received, a playing duration of the media content is determined, and the playing duration meets a first preset duration, the target feedback interface is displayed.

In an optional embodiment, in response to a target subject performing a page operation of getting in any live room from the video preview stream and then returning to the video preview stream from a certain live room, the target feedback interface is displayed to acquire a feedback input of the target subject.

In another optional embodiment, in response to a target subject continuously watching live streaming in the video preview stream for a certain duration, video recommendation feedback information can be presented, thereby reducing the impact on the target subject's watching experience. Thus, in the embodiment of the present disclosure, when the playing operation for the target media content is received, a playing duration of the media content is determined, and then in response to determining that the playing duration meets a first preset duration, the target feedback interface is displayed.

In another optional embodiment, in response to a page operation of a target subject exiting from a live room, the target feedback interface can be displayed.

In another optional embodiment, in response to the number of switching operations for the video preview stream reaching a threshold and the dwell time for each video being shorter than a threshold, the target feedback interface can be displayed to satisfy the target subject's needs to actively provide feedback by inputting a chosen video type, such that users' experience is enhanced.

In practical applications, the target feedback interface is used to display video recommendation feedback information, wherein the video recommendation feedback information can be questions in the form of text, pictures, etc.

S102: Receiving an input for the video recommendation feedback information presented on the target feedback interface.

In the embodiments of the present disclosure, after displaying the target feedback interface, the target subject may determine an input for the video recommendation feedback information presented on the target feedback interface, so as to provide feedback.

In an optional embodiment, a plurality of options corresponding to the video recommendation feedback information can be displayed on the target feedback interface, and the target subject may complete the input by clicking any of the options.

In another optional embodiment, an input box corresponding to the video recommendation feedback information may be displayed on the target feedback interface, and the target subject may complete the input by entering text or the like in the input box.

S103: Sending the input to a server to determine a video to be recommended corresponding to the input.

In the embodiments of the present disclosure, after receiving the input for the video recommendation feedback information on the target feedback interface, the input is sent to a server, and the server determines corresponding a video to be recommended based on the input.

In an optional embodiment, after receiving the input for the video recommendation feedback information on the target feedback interface, a correspondence between the video recommendation feedback information and the input is established, and the correspondence is sent to the server, so that the server can adjust a video recommendation strategy for the feedback user based on the correspondence.

In the recommendation method provided in the embodiments of the present disclosure, when determining that an operation for target media content meets a preset condition, a target feedback interface is displayed, and then an input acting on the target feedback interface is received and sent to a server, for determining a video to be recommended corresponding to the input. It can be seen that the embodiments of the present disclosure are able to acquire the feedback input of the target subject for the video recommendation feedback information to thereby enhance the users' video playing experience.

In an optional embodiment, a client acquires a collection of video recommendation feedback information in advance, wherein the collection of video recommendation feedback information contains a plurality of pieces of video recommendation feedback information. In an optional embodiment, a server can preset a collection of video recommendation feedback information based on feedback needs, and then distribute it to the client for local storage, application, etc.

In actual applications, when the client determines that an operation for target media content meets a preset condition, the client may, based on the operation for the target media content, determine at least one question that needs a feedback for a current target subject from the collection of video recommendation feedback information acquired in advance, to be presented on the target feedback interface.

In an optional embodiment, for a switching operation of switching from a live video stream to a video preview stream, video recommendation feedback information can be determined based on a live stream type to which a live video corresponding to the switching operation belongs. For example, when determining that a current target subject performs a switching operation of entering a first live room from a video preview stream and then returning to the video preview stream by closing a second live room, video recommendation feedback information can be determined based on a live stream type to which the second live room belongs, wherein the first live room and the second live room can be the same live room or different live rooms.

In an optional embodiment, when a switching operation of switching from the live video stream to the video preview stream is received, a question template corresponding to the switching operation of switching from the live video stream to the video preview stream is acquired from the collection of video recommendation feedback information acquired in advance, and then, based on a live stream type to which a live video corresponding to the switching operation belongs, the question template is populated such that video recommendation feedback information is obtained, and then a target feedback interface on which the video recommendation feedback is presented is displayed. For example, the question template may include "what is your feedback about [ ] on APP recently?", wherein, the [ ] can be filled based on a live type to which a live video corresponding to a switching operation belongs, and the question that needs feedback is therefore obtained for being presented to the current target subject. For example, after filling a live type to which a live video corresponding to a switching operation belongs into the question template, video recommendation feedback information obtained may be "what is your feedback about [Game Live Stream] on APP recently?", or "what is your feedback about [Live Stream Shopping] on **APP recently?", etc.

In the embodiments of the present disclosure, when the playing operation for the target media content is received, a playing duration of the media content is determined, and then in response to determining that the playing duration meets a first preset duration, the target feedback interface is displayed. The video recommendation feedback information corresponding to the playing operation for the target media content that is triggered after the playing duration of the media content meets the first preset duration can include "what is your feedback about [Game Live Stream] on APP recently?", "what is your feedback about [Live Stream Shopping] on APP recently?", etc. that are video recommendation feedback information raised for random types of live rooms, and can also include video recommendation feedback information such as "Do you want to adjust the number of live streams on **APP"?, "Are you satisfied with the live stream you just watch?", etc.

In addition, upon receiving a switching operation of swiping for the live video stream, video recommendation feedback information is determined based on a live stream type to which a live video before switching corresponding to the switching operation of swiping belongs, and then the target feedback interface on which the video recommendation feedback information is presented is displayed.

The video recommendation feedback information determined based on a live stream type to which a live video corresponding to the switching operation of swiping for the live video stream belongs can include "what is your feedback about [Game Live Stream] on APP recently?", "what is your feedback about [Live Stream Shopping] on APP recently?", etc. that are video recommendation feedback information raised for live stream types, and can also include video recommendation feedback information such as "Are you satisfied with the live stream you just watch?", "Do you think the introduction of the commodity by the anchor just now is professional?", etc. that are randomly determined.

In an optional embodiment, as shown in FIG. 2, a schematic diagram of a target feedback interface provided in an embodiment of the present disclosure is illustrated, wherein a question that needs a feedback displayed on the target feedback interface include: "what is your feedback about [Game Live Stream] on **APP recently?", and video recommendation feedback information includes at least three options, i.e., A. Hope to reduce this type of live streams; B. Hope to keep the number of this type of live streams unchanged; and C. want to increase this type of live streams. The target subject implements a feedback input for the video recommendation feedback information by clicking any of the options.

In addition, a video type identifier and corresponding input controls can be displayed on the target feedback interface, as shown in FIG. 2. The video type identifier can include video cover images. Each video cover image is used to represent its corresponding video type, for example, a game video cover image can represent a game video type, a shopping video cover image can represent a shopping video type, etc. Specifically, the video cover image may be from a last video, and the input controls can include controls corresponding to the options for video recommendation feedback information. As shown in FIG. 2. the target feedback interface includes three input controls. Based on the input controls, it is possible to receive a feedback input of a target subject.

In an optional embodiment, after a current target subject enters any live room from a video preview stream and then returns to the video preview stream by closing the same or another live room, the question that needs a feedback can be displayed on a first page shown after returning to the preview stream so as to acquire a true feedback from the current target subject on video recommendation content.

Figure 3:
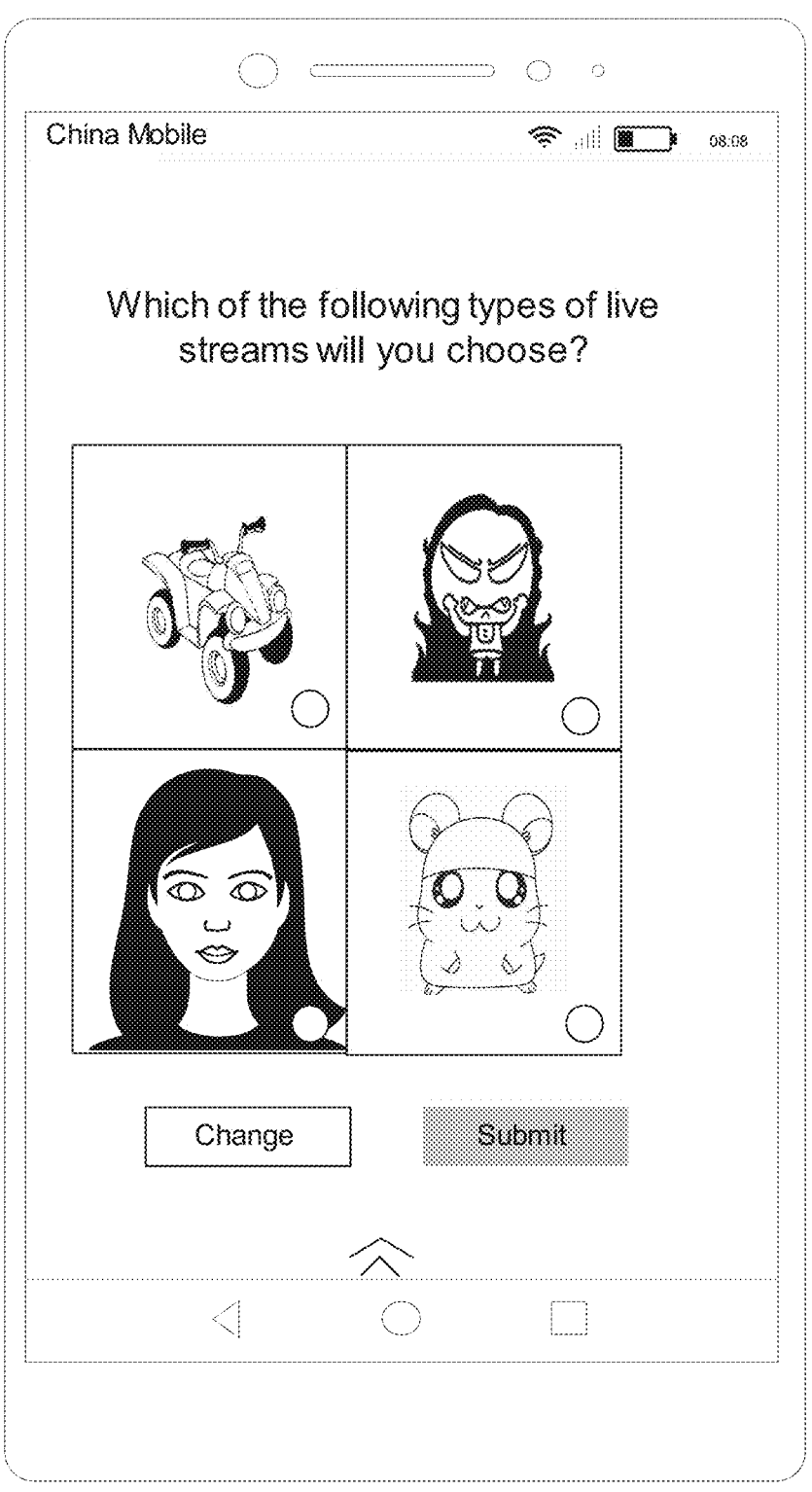
FIG. 3 is a schematic diagram of another target feedback interface provided in embodiments of the present disclosure.

In another optional embodiment, as shown in FIG. 3, a schematic diagram of another target feedback interface provided in an embodiment of the present disclosure is shown, wherein a picture type question, a plurality of video type identifiers and corresponding input controls are displayed on the target feedback interface. The video type identifiers may include video cover images, and different video cover images may represent different types of videos. The target subject, by clicking an input control corresponding to any of the video type identifiers, implements a feedback input for a video type corresponding to the video type identifier.

In addition, on the above target feedback interface shown in FIG. 3, a feedback interface switching identifier can also be displayed, such as a "Change" control, which is used to trigger a switching of the presentation of video recommendation feedback information. When a current target subject does not choose the presented video recommendation feedback information, it is possible to allow the target subject to switch the video recommendation feedback information, close the target feedback interface, etc.

In an optional embodiment, the current target subject can quickly switch the video recommendation feedback information presented on the target feedback interface by continuously clicking the "Change" control shown in FIG. 3, so as to quickly locate video recommendation feedback information that meets the real video type requirements of the current target subject.

In addition, when it is determined that the number of switching operations for the video recommendation feedback information presented on the target feedback interface, which are triggered by the target subject continuously clicking the "Change" control, reaches a preset threshold, an automatic closure of the target feedback interface can be triggered, so as to reduce disturbance to the current target subject and improve the target subject experience.

In practical applications, a switched feedback interface is displayed when a trigger operation acting on the feedback interface switching identifier or a swipe operation acting on the target feedback interface is received.

Figure 4:
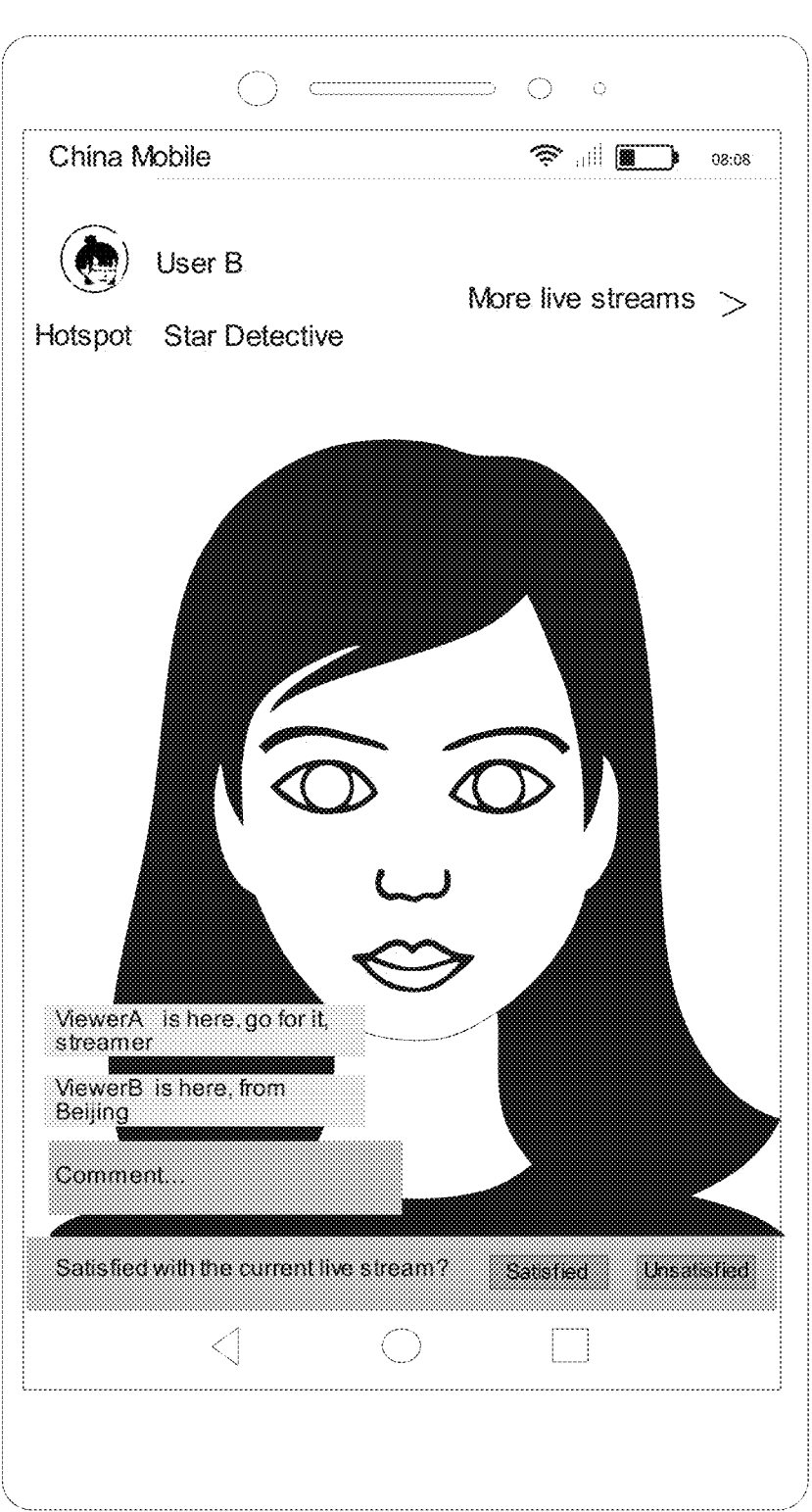
FIG. 4 is a schematic diagram of another target feedback interface provided in embodiments of the present disclosure.

In another optional embodiment, as shown in FIG. 4, a schematic diagram of another target feedback interface provided in an embodiment of the present disclosure is illustrated, wherein a question that needs a feedback displayed on the target feedback interface include: "Are you satisfied with the current live stream?", and video recommendation feedback information includes two options, namely "satisfied" and "dissatisfied". The target subject, by clicking any of the options, implements a feedback input for the video recommendation feedback information.

In the embodiment of the present disclosure, a client, upon receiving a feedback input of a current target subject for the video recommendation feedback information, establishes a correspondence between the video recommendation feedback information and the feedback input.

In addition, for a switching operation for any live video, a live room identifier corresponding to the live video, such as a live room number, etc., may also be obtained, and then a correspondence between the live room identifier, the video recommendation feedback information and the feedback input may be established.

Based on the above embodiments, in order to further enhance the users' video playing experience, a most recent target feedback interface display time can be first determined when it is determined that the operation for the target media content meets a preset condition. If it is determined that a time difference between the most recent target feedback interface display time and a current time is greater than a second preset duration, the step of displaying the target feedback interface is performed. Otherwise, the presentation of the video recommendation feedback information ends.

The embodiments of the present disclosure, in response to determining the operation for the target media content meets the preset condition, first determine whether display frequency control is met at present, i.e., whether a time difference between two presentations of the video recommendation feedback information is greater than the second preset duration, to enhance the target subject's video playing experience.

Figure 5:
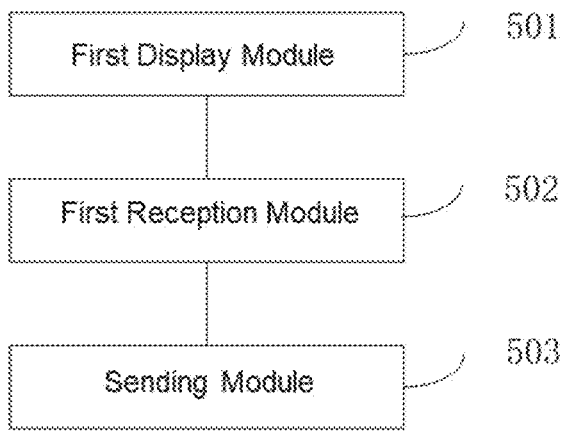
FIG. 5 is a schematic structural diagram of an apparatus for recommendation provided in embodiments of the present disclosure.

Based on the same inventive concept as the above embodiments, the present disclosure further provides an apparatus for recommendation. Referring to FIG. 5, there is shown a schematic structural diagram of an apparatus for recommendation provided in an embodiment of the present disclosure, the apparatus comprising: a first display module 501 for displaying a target feedback interface in response to an operation for target media content meeting a preset condition, wherein video recommendation feedback information is presented on the target feedback interface; a first reception module 502 for receiving an input for the video recommendation feedback information presented on the target feedback interface; and a sending module 503 for sending the input to a server to determine a video to be recommended corresponding to the input.

In an optional embodiment, the first display module includes: a first display sub-module for displaying the target feedback interface in response to a switching operation for the target media content; or a second display sub-module for determining a playing duration of the media content in response to a playing operation for the target media content, and displaying the target feedback interface in response to determining that the playing duration meeting a first preset duration.

In an optional embodiment, the target media content includes a video preview stream or a live video stream, and the first display sub-module is specifically used for displaying the target feedback interface in response to a switching operation for the video preview stream or the live video stream.

In an optional embodiment, the first display sub-module includes: a third display sub-module for displaying the target feedback interface in response to a switching operation of swiping for the video preview stream or the live video stream; or, a fourth display sub-module for displaying the target feedback interface in response to a switching operation of switching from the live video stream to the video preview stream.

In an optional embodiment, the fourth display sub-module includes: a first determination sub-module for determining, in response to a switching operation of switching from the live video stream to the video preview stream, video recommendation feedback information based on a live stream type to which a live video corresponding to the switching operation belongs, wherein the live video belongs to the live video stream; and a fifth display sub-module for displaying the target feedback interface on which the video recommendation feedback information is presented.

In an optional embodiment, the third display sub-module includes: a second determination sub-module for determining, in response to a switching operation of swiping for the live video stream, video recommendation feedback information based on a live stream type to which a live video before switching corresponding to the switching operation of swiping belongs; and a sixth display sub-module for displaying the target feedback interface on which the video recommendation feedback information is presented.

In an optional embodiment, the apparatus further comprises: a first determination module for determining a most recent time for presenting the target feedback interface in response to an operation for target media content meeting a preset condition; and a trigger module for triggering the execution by the first display module, when it is determined that a time difference between the most recent time for presenting the target feedback interface and a current time is greater than a second preset duration.

In an optional embodiment, a video type identifier and corresponding input controls are displayed on the target feedback interface, and the input controls are used for receiving the input of a target subject for the video recommendation feedback information.

In an optional embodiment, a feedback interface switching identifier and a plurality of video type identifiers and corresponding input controls are displayed the target feedback interface and the input controls are used for receiving the input of a target subject for the video recommendation feedback information.

In an optional embodiment, the apparatus further comprises: a second display module for displaying a switched feedback interface upon receiving a trigger operation acting on the feedback interface switching identifier or a swipe operation acting on the target feedback interface.

The apparatus for recommendation provided in the embodiments of the present disclosure is capable of acquiring the feedback input of the target subject for the video recommendation feedback information and enhancing the target subject's video playing experience.

In addition to the above method and apparatus, the embodiments of the present disclosure further provide a non-transitory computer readable storage medium having stored therein instructions that, when run on a terminal device, causes the terminal device to implement the recommendation method described in the embodiments of the present disclosure.

The embodiments of the present disclosure further provide a computer program product, comprising a computer program/instructions that, when executed by a processor, implements the recommendation method described in the embodiments of the present disclosure.

Figure 6:
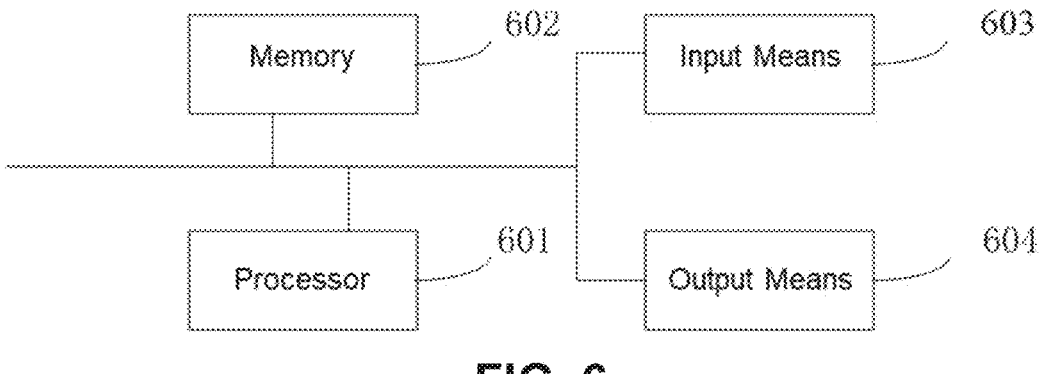
FIG. 6 is a schematic structural diagram of a device for recommendation provided in embodiments of the present disclosure.

In addition, the embodiments of the present disclosure further provide a device for recommendation. With reference to FIG. 6, the device for recommendation can comprise: a processor 601, a memory 602, an input means 603, and an output means 604. The device for recommendation may comprise one or more processors 601, and in FIG. 6, one processor is taken as an example. In some embodiments of the present disclosure, the processor 601, the memory 602, the input means 603 and the output means 604 may be connected via a bus or otherwise, wherein in FIG. 6, connection via a bus is taken as an example.

The memory 602 may be used to store software programs and modules, and the processor 601 executes various functional applications and data processing of the device for recommendation by operating the software programs and modules stored in the memory 602. The memory 602 may mainly include a program store and a data store, wherein the program store may store an operating system, an application program required for at least one function, and the like. Further, the memory 602 may include high-speed random-access memory, and may also include non-volatile memory, such as at least one magnetic disk storage device, flash memory device, or other volatile solid-state storage device. The input means 603 may be used to receive input numeric or character information and to generate signal inputs related to user settings and function control of the device for recommendation.

Specifically, in the present embodiments, the processor 601 loads executable files corresponding to processes of one or more application programs into the memory 602, and the application programs stored in the memory 602 are run by the processor 601 to thereby implement various functions of the device for recommendation mentioned above.

It is to be noted that the terms used herein to describe relations such as "a first" and "a second" are only used to distinguish one entity or operation from another, but shall not require or suggest that these entities or operations have such an actual relation or sequence. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors inherent to the process, method, article or apparatus. Without more limitations, a factor defined with the sentence "comprising a . . . " does not exclude the case that the process, method, article or apparatus comprising said factor still comprises other identical factors.

The above are only specific embodiments of the present disclosure, which are used to enable those skilled in the art to understand or implement the present disclosure. Various modifications to these embodiments will be readily apparent to those skilled in the art. The general principles defined herein may be applied to other embodiments without departing from the spirit and scope of the present disclosure. Accordingly, the present disclosure will not be limited to these embodiments described herein, but will be subject to the broadest scope consistent with the principles and novel features disclosed herein.

The invention claimed is:

1. A recommendation method, the method comprising:
displaying a feedback interface in response to an operation for target media content meeting a preset condition, wherein video recommendation feedback information is presented on the feedback interface by presenting on the feedback interface at least one media content type identifier and input controls corresponding to the at least one media content type identifier, and the input controls indicate a feedback of a target subject for media content types corresponding to the at least one media content type identifier;
receiving, via the input controls, an input for the video recommendation feedback information presented on the feedback interface, the input being determined by the target subject to provide the feedback of the target subject for media content types; and
sending the input to a server to determine a video to be recommended corresponding to the input.

2. The method according to claim 1, wherein the displaying the feedback interface in response to the operation for the target media content meeting the preset condition comprises:
displaying the feedback interface in response to a switching operation for the target media content; or
determining a playing duration of the target media content in response to a playing operation for the target media content, and displaying the feedback interface in response to the playing duration meeting a first preset duration.

3. The method according to claim 2, wherein the target media content includes a video preview stream or a live video stream.

4. The method according to claim 3, wherein the displaying the feedback interface in response to the switching operation for the target media content comprises:
displaying the feedback interface in response to a switching operation of swiping for the video preview stream or the live video stream; or
displaying the feedback interface in response to a switching operation of switching from the live video stream to the video preview stream.

5. The method according to claim 4, wherein the displaying the feedback interface in response to the switching operation of switching from the live video stream to the video preview stream comprises:
in response to the switching operation of switching from the live video stream to the video preview stream, determining video recommendation feedback information based on a live stream type to which a live video corresponding to the switching operation belongs, wherein the live video belongs to the live video stream; and displaying the feedback interface on which the video recommendation feedback information is presented.

6. The method according to claim 4, wherein the displaying the feedback interface in response to the switching operation of swiping for the video preview stream or the live video stream comprises:

in response to a switching operation of swiping for the live video stream, determining video recommendation feedback information based on a live stream type to which a live video before switching corresponding to the switching operation of swiping belongs; and displaying the feedback interface on which the video recommendation feedback information is presented.

7. The method according to claim 1, wherein prior to the displaying the feedback interface, the method further comprises:

in response to an operation for target media content meeting a preset condition, determining a most recent time for presenting the feedback interface; and in response to determining that a time difference between the most recent time for presenting the feedback interface and a current time is greater than a second preset duration, performing the displaying the feedback interface.

8. The method according to claim 1, wherein a feedback interface switching identifier, a plurality of video type identifiers and corresponding input controls are displayed on the feedback interface.

9. The method according to claim 8, wherein subsequent to the displaying the feedback interface, the method further comprises:

displaying a switched feedback interface upon receiving a trigger operation acting on the feedback interface switching identifier or a swipe operation acting on the feedback interface.

10. A non-transitory computer readable storage medium having stored therein instructions that, when run on a terminal device, cause the terminal device to implement a method comprising:

displaying a feedback interface in response to an operation for target media content meeting a preset condition, wherein video recommendation feedback information is presented on the feedback interface by presenting on the feedback interface at least one media content type identifier and input controls corresponding to the at least one media content type identifier, and the input controls indicate a feedback of a target subject for media content types corresponding to the at least one media content type identifier;

receiving, via the input controls, an input for the video recommendation feedback information presented on the feedback interface, the input being determined by the target subject to provide the feedback of the target subject for media content types; and sending the input to a server to determine a video to be recommended corresponding to the input.

11. The non-transitory computer readable storage medium according to claim 10, wherein the displaying the feedback interface in response to the operation for the target media content meeting the preset condition comprises:

displaying the feedback interface in response to a switching operation for the target media content; or determining a playing duration of the target media content in response to a playing operation for the target media content, and displaying the feedback interface in response to the playing duration meeting a first preset duration.

12. The non-transitory computer readable storage medium according to claim 11, wherein the target media content includes a video preview stream or a live video stream.

13. The non-transitory computer readable storage medium according to claim 12, wherein the displaying the feedback interface in response to the switching operation for the target media content comprises:

displaying the feedback interface in response to a switching operation of swiping for the video preview stream or the live video stream; or displaying the feedback interface in response to a switching operation of switching from the live video stream to the video preview stream.

14. The non-transitory computer readable storage medium according to claim 13, wherein the displaying the feedback interface in response to the switching operation of switching from the live video stream to the video preview stream comprises:

in response to the switching operation of switching from the live video stream to the video preview stream, determining video recommendation feedback information based on a live stream type to which a live video corresponding to the switching operation belongs, wherein the live video belongs to the live video stream; and displaying the feedback interface on which the video recommendation feedback information is presented.

15. The non-transitory computer readable storage medium according to claim 10, wherein prior to the displaying the feedback interface, the method further comprises:

in response to an operation for target media content meeting a preset condition, determining a most recent time for presenting the feedback interface; and in response to determining that a time difference between the most recent time for presenting the feedback interface and a current time is greater than a second preset duration, performing the displaying the feedback interface.

16. A device, comprising: a memory, a processor, and a computer program stored on the memory and executable on the processor that, when executed by the processor, implements a method comprising:

displaying a feedback interface in response to an operation for target media content meeting a preset condition, wherein video recommendation feedback information is presented on the feedback interface by presenting on the feedback interface at least one media content type identifier and input controls corresponding to the at least one media content type identifier, and the input controls indicate a feedback of a target subject for media content types corresponding to the at least one media content type identifier;

receiving, via the input controls, an input for the video recommendation feedback information presented on the feedback interface, the input being determined by the target subject to provide the feedback of the target subject for media content types; and sending the input to a server to determine a video to be recommended corresponding to the input.

17. The device according to claim 16, wherein the displaying the feedback interface in response to the operation for the target media content meeting the preset condition comprises:

displaying the feedback interface in response to a switching operation for the target media content; or determining a playing duration of the target media content in response to a playing operation for the target media content, and displaying the feedback interface in response to the playing duration meeting a first preset duration.

18. The device according to claim 17, wherein the target media content includes a video preview stream or a live video stream, and the displaying the feedback interface in response to the switching operation for the target media content comprises:

displaying the feedback interface in response to a switching operation of swiping for the video preview stream or the live video stream; or displaying the feedback interface in response to a switching operation of switching from the live video stream to the video preview stream.

19. The device according to claim 18, wherein the displaying the feedback interface in response to the switching operation of swiping for the video preview stream or the live video stream comprises:

in response to a switching operation of swiping for the live video stream, determining video recommendation feedback information based on a live stream type to which a live video before switching corresponding to the switching operation of swiping belongs; and displaying the feedback interface on which the video recommendation feedback information is presented.

* * * * *